(12) United States Patent
Buttolo et al.

(10) Patent No.: US 12,282,326 B2
(45) Date of Patent: Apr. 22, 2025

(54) REMOTE MANEUVERING SYSTEM FOR A VEHICLE AND ASSOCIATED METHOD

(71) Applicant: Ford Global Technologies, LLC, Dearborn, MI (US)

(72) Inventors: Pietro Buttolo, Dearborn Heights, MI (US); Neha Singhal, Northville, MI (US); Biaohe Guo, Northville, MI (US); Mark Larry, Macomb, MI (US); Kenneth Michael Mayer, Ypsilanti, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 148 days.

(21) Appl. No.: 18/170,128

(22) Filed: Feb. 16, 2023

(65) Prior Publication Data

US 2024/0280984 A1    Aug. 22, 2024

(51) Int. Cl.
*G05D 1/00*    (2024.01)
*B60W 30/06*    (2006.01)

(52) U.S. Cl.
CPC ............. *G05D 1/005* (2013.01); *B60W 30/06* (2013.01)

(58) Field of Classification Search
CPC .................................................... B60W 30/06
See application file for complete search history.

(56) References Cited

U.S. PATENT DOCUMENTS

| | | | |
|---|---|---|---|
| 9,569,954 B2 | 2/2017 | Ganz et al. | |
| 10,179,585 B2 | 1/2019 | Bonnet et al. | |
| 10,406,979 B2 * | 9/2019 | Kim | B60Q 9/002 |
| 11,059,423 B1 * | 7/2021 | Weaver | B62D 33/027 |
| 2019/0220001 A1 * | 7/2019 | Lavoie | G05D 1/005 |
| 2022/0155778 A1 | 5/2022 | Raeis Hosseiny et al. | |

FOREIGN PATENT DOCUMENTS

| | | |
|---|---|---|
| DE | 102016214433 A1 | 2/2018 |
| DE | 102016226008 A1 | 6/2018 |

OTHER PUBLICATIONS

Stephen Fenech, Mercedes Benz Demonstrates Remote Control Parking With a Smartphone, In-Car News, Tech Guide, Jul. 11, 2015, 1-3.

* cited by examiner

*Primary Examiner* — Jason Holloway
*Assistant Examiner* — Elizabeth Rose Neleski
(74) *Attorney, Agent, or Firm* — Frank Lollo; Eversheds Sutherland (US) LLP (57) ABSTRACT

A system includes a processor and a memory. The memory includes instructions that, when executed by the processor, cause the processor to perform operations including perform a remote maneuver of a vehicle, and instruct a mobile device to provide a feedback to an individual.

19 Claims, 5 Drawing Sheets

REMOTE MANEUVERING SYSTEM FOR A VEHICLE AND ASSOCIATED METHOD

BACKGROUND

Some vehicles have remote maneuvering capabilities built in, such that users of mobile devices can control the vehicles when located outside of the vehicles. For example, such vehicles may have remote park-assist capabilities that allow the users to park the vehicles with their mobile devices when located outside of (e.g., standing near) the vehicles. Such vehicles may also be trucks and may allow the individuals to extend truck beds with their mobile devices when located outside of the vehicles.

BRIEF DESCRIPTION OF THE DRAWINGS

The detailed description is set forth with reference to the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

DETAILED DESCRIPTION

Overview

The systems and methods disclosed herein assist at least in part in providing feedback to mobile devices of individuals who are performing remote maneuvers of vehicles. In one example, the systems include processors and memories. The memories may have instructions that cause the processors to perform a remote maneuver of the vehicle and instruct a mobile device to provide a feedback to an individual.

In one example, the feedback to the mobile device of the individual is a haptic feedback (e.g., is a vibration emanating from the mobile device). In some instances, typical remote maneuvering systems do not provide feedback to mobile devices of individuals, but rather rely on rather loud audio messages emanating from the vehicles. Second, by being a haptic feedback, crowded streets will generally not have excessive noise from individuals who are remotely maneuvering their vehicles.

In another example, the feedback to the mobile device of the individual is an audio feedback. By being an audio feedback from the mobile phone of the individual instead of from the vehicle, excessive noise may be minimized.

Additionally, the remote maneuver of the disclosed system may be a number of different remote maneuvers. For example, the remote maneuver may be a remote park-assist. As the vehicle gets closer to other objects (e.g., other vehicles in a parking lot), the processor of the vehicle may instruct the mobile device of the individual to provide an increasingly intense feedback. In other words, the closer the vehicle gets to another object, the more intense the haptic feedback given off. Furthermore, the haptic feedback given off by the mobile device may be either linear or non-linear. That is, the haptic feedback may get linearly more intense as the distance between the vehicle and another object closes or may change in a non-linear manner. An example of a non-linear escalation of the haptic feedback would be as the distance decreases a first amount, the haptic feedback stays constant, but as the distance decreases a second larger amount, the haptic feedback jumps to a greater level and is again constant for a certain range of distances.

Another example of a remote maneuver of a vehicle is where the vehicle is a truck with a truck body and an extendable truck bed movably coupled to the truck body. The remote maneuver may comprise the individual remotely moving the truck bed with respect to the truck body. Similar to the remote park-assist, as the truck bed gets closer to objects, the processor of the truck is configured to instruct the mobile device of the individual to provide a feedback. The feedback may be a haptic feedback that increases as the distance between the truck bed and another object decreases.

Additionally, in one example embodiment, the haptic feedback has a controllable parameter that is dependent on a distance of the vehicle with respect to another object as measured by a distance sensor of the vehicle. The controllable parameter may be either an intensity of mechanical vibration, an intensity of surface friction, a time duration, and/or a frequency of vibration. For example, as the distance of the vehicle with respect to an object decreases, either the intensity of mechanical vibration and the surface friction increases, the time duration decreases, and/or the frequency of vibration increases.

Finally, the mobile device may have predetermined settings corresponding to a reference distance of the vehicle with respect to a predetermined location. This may translate to a garage of the individual. Additionally, the processor of the vehicle may further employ a GPS system and a camera to determine whether the vehicle is within the reference distance (e.g., is properly parked in the garage) and thereby cause the mobile device to provide the feedback to the individual. Data from weight sensors, transmitters, and/or receivers may also be sent to the mobile device to provide feedback.

These and other advantages of the present disclosure are provided in greater detail herein.

Illustrative Embodiments

As employed herein, the term "coupled" shall mean connected together either directly or via one or more intermediate parts or components.

Figure 1A:
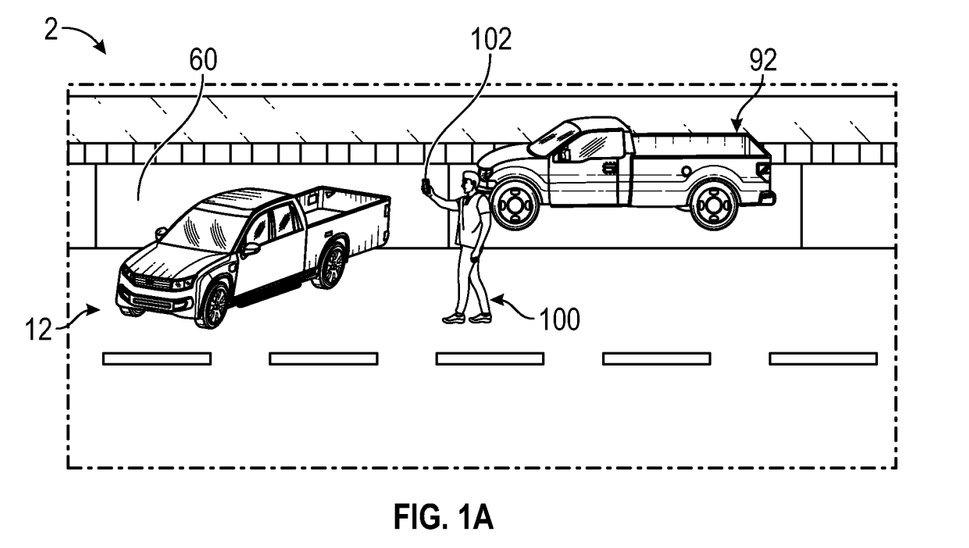
FIG. 1A is an isometric view of a person performing a remote maneuver of a vehicle in accordance with one non-limiting embodiment of the disclosed concept.
Figure 1B:
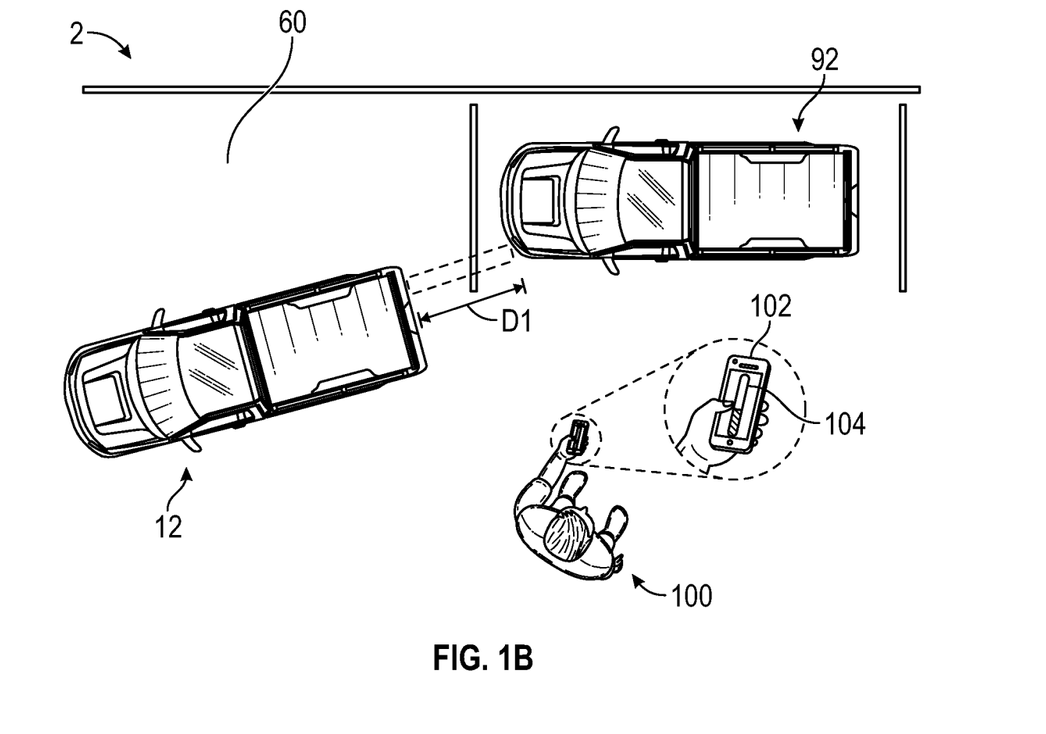
FIG. 1B is a top plan view of the person performing the remote maneuver of the vehicle of FIG. 1A.
Figure 2:
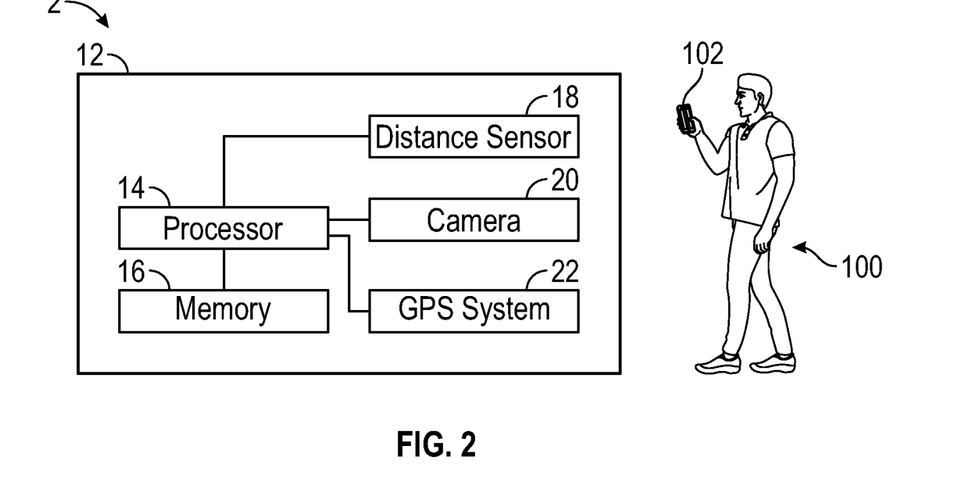
FIG. 2 is a simplified view of the person and the vehicle of FIG. 1A.
Figure 3:
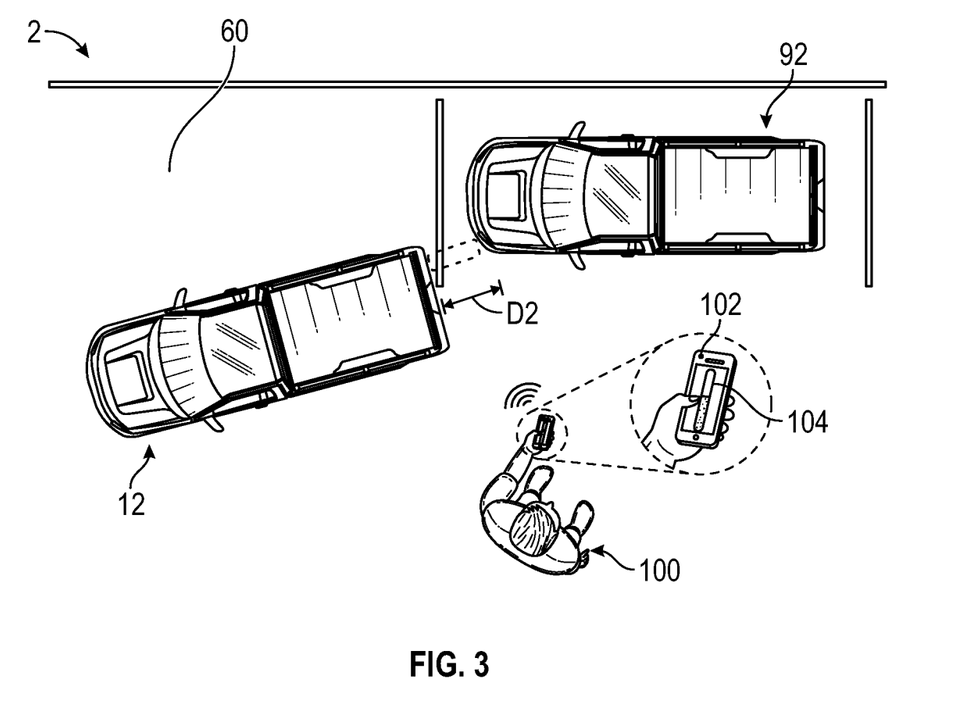
FIG. 3 is another top plan view of the person performing the remote maneuver of the vehicle of FIG. 1A shown with the vehicle moved to another position.
Figure 4:
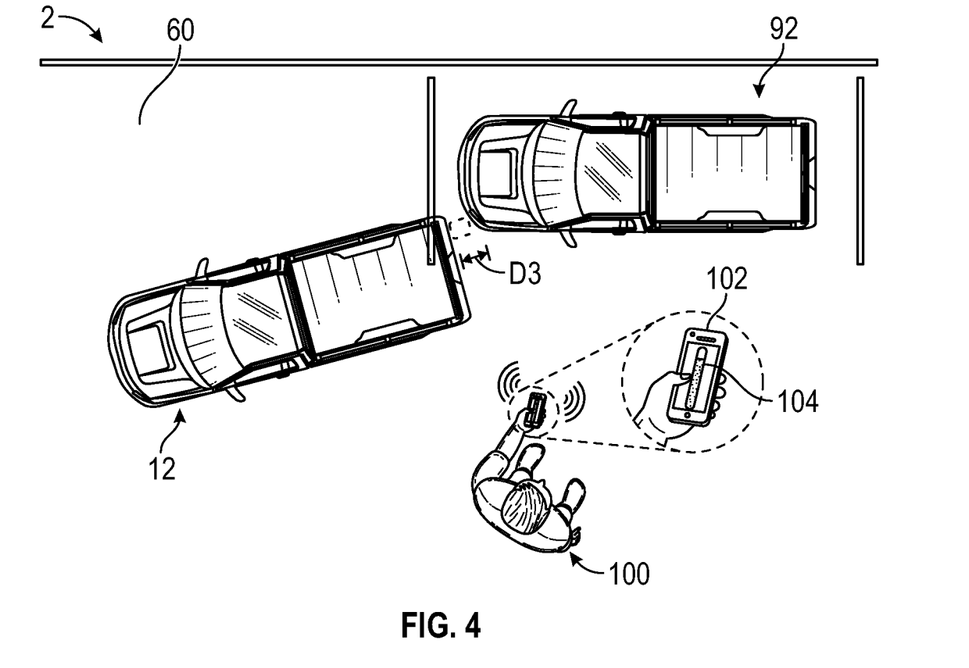
FIG. 4 is another top plan view of the person performing the remote maneuver of the vehicle of FIG. 1A shown with the vehicle moved to yet another position.

FIG. 1A is an isometric view of a remote maneuvering system 2. In one example, the remote maneuvering system 2 includes a vehicle (e.g., truck 12) and a mobile device (e.g., mobile phone 102 being held by an individual 100). The mobile phone 102 may be connected to the truck 12 via WIFI, Bluetooth, Ultra-wideband (UWB), and/or another suitable connection. FIG. 1B shows a top plan view of the system 2, and FIG. 2 shows a simplified view of the system 2. As shown in FIG. 2, the truck 12 includes a processor 14, a memory 16, a distance sensor 18 electrically connected to the processor 14, a camera 20 electrically connected to the processor 14, and a GPS system 22 electrically connected to the processor 14. In one example, the memory 16 includes instructions that, when executed by the processor 14, cause the processor to perform operations including performing a remote maneuver of the truck 12 and instructing the mobile phone 102 to provide a feedback to an individual. The feedback may, for example, alert the individual that the truck 12 is close to an object.

A first remote maneuver of the truck 12 will be described in connection with FIGS. 1A-4. As shown, the first remote maneuver being performed in FIGS. 1A-4 is a remote park-assist, wherein the individual 100 is standing outside of the truck 12 and is attempting to park the truck 12 into an empty parking space 60. Specifically, the individual 100 is sliding his hand on a surface of the mobile phone 102 (e.g., via a distance control mechanism 104, which may be part of an APP on the mobile phone 102) in order to move the truck 12. Additionally, as the truck 12 is being parked into the parking space 60, the truck 12 is being moved closer to another vehicle 92. It will be appreciated that the system is structured for situations when the truck is being moved closer to any other objects as well, e.g., a streetlight or fire hydrant.

In one example, the truck 12 is spaced a first distance D1 (FIG. 1B) from the other vehicle 92 in a first position, a second distance D2 (FIG. 3) from the other vehicle 92 in a second position, and a third distance D3 (FIG. 4) from the other vehicle 92. This corresponds to the truck 12 being backed toward the other vehicle 92 and as such would follow with the truck 12 turning into the parking space 60. As such, the distance D1 (FIG. 1B) is greater than the distance D2 (FIG. 3), which in turn is greater than the distance D3 (FIG. 4), all of which correspond to the truck 12 backing toward the other vehicle 92 remotely via the mobile device 102.

Additionally, in one example, the instructions sent from the processor 14 of the truck 12 to the mobile phone 102 correspond to the feedback being haptic feedback (e.g., a vibration of the mobile phone 102). The haptic feedback may be based on mechanical movement of actuators and/or be based either on surface friction generated by electrostatic fields or ultrasonic fields. This is advantageous for a number of reasons. For example, some systems of performing remote maneuvers of vehicles may use audio signals being sent from the vehicles to remind users of how close they are to other objects as they are performing the remote maneuvers. When multiple vehicles are in close proximity to each other, the excessive amount of audio signals from vehicles is undesirable. In accordance with the disclosed concept, the haptic feedback provided by the mobile phone 102 of the individual 100 addresses this issue. That is, the relatively silent nature of the haptic feedback of the mobile phone 102 beneficially allows multiple individuals performing remote maneuvers of respective vehicles in close proximity to one another to not be disturbed by each other. This is further advantageous in that the disclosed system 2 actually provides feedback to the mobile phone 102 as the remote park-assist is being performed.

Moreover, in one example embodiment, the haptic feedback has a controllable parameter that is dependent on a distance of the truck 12 with respect to another object (e.g., without limitation, the other vehicle 92) as measured by the distance sensor 18. That is, the distance sensor 18, or a plurality of distance sensors, may thus provide distance information to inform the processor 14 of a proximity to another object. The controllable parameter may be either an intensity of the mechanical vibration, an intensity of surface friction, a time duration, and/or a frequency of vibration. For example, as the distance of the truck 12 with respect to the other vehicle 92 decreases (e.g., when the truck moves from the position of FIG. 1B, to the position of FIG. 3, and then to the position of FIG. 4), either the intensity of mechanical vibration and the surface friction increases, the time duration decreases, and/or the frequency of vibration increases. This can be seen by viewing the mobile phone 102 in each of these positions, wherein different intensities of the haptic feedback are being signaled as being emanated from the mobile phone 102 in each of the three positions of the truck 12.

It will also be appreciated that the processor 14 may perform the remote maneuver of the truck 12 only when the mobile phone 12 is within a predetermined distance of the truck 12. That is, the remote maneuver of the truck 12 is only configured to be performed by the individual 100 when his mobile phone 102 is within range of the truck 12.

The truck 12 is also configured to be remotely parked into other locations besides the empty parking space 60 on the corresponding street. More specifically, in one example embodiment, the mobile phone 102 may have predetermined settings corresponding to a reference distance of the truck 12 with respect to a predetermined location. For example, the individual 100 can set a reference distance to the walls of his own home garage for the truck 12. These may be stored in an APP on the mobile phone 102. In order to determine if the truck 12 is properly parked in a garage, GPS services or geotagging technologies may be employed. Geographical location information may be collected by the GPS system 22 (FIG. 3), geotagging, or other location information to determine if the truck 12 is in a garage or other particular location. The camera 20 (FIG. 3) may also be employed to determine if the truck 12 is in a garage or other particular location. Finally, weight sensing technologies located in garage floors or other locations, or transmitters and receivers, may assist in determining whether the truck 12 is in the garage or other particular location. In other words, data from aspects of the garage (e.g., weight sensors, transmitters, and/or receivers) communicates with the mobile phone 102 to further provide haptic feedbacks, like the data being gathered by the distance sensor 18.

Accordingly, the memory 16 may further include instructions that cause the processor 14 to employ the GPS system 22 and the camera 20 to determine whether the truck 12 is within the reference distance with respect to the predetermined location and thereby cause the mobile phone 102 to provide the feedback to the individual 100. The memory 16 may also include instructions that cause the processor 14 to receive data from any weight sensor, transmitter, and/or receiver corresponding to a position of the truck 12 with respect to another object (e.g., a wall of a garage) and send the data to the mobile phone 102 so that the mobile phone 102 can provide the feedback to the individual 100.

The aforementioned settings that may be stored in the mobile phone 102 can also be learned by the mobile phone 102 over time. For example, the mobile phone 102 may learn the settings itself (e.g., the settings by which the truck 12 may be parked into a garage), using Artificial Intelligence and/or Machine Learning. A control APP on the mobile phone 102 may give out the haptic feedback feeling when the fingers of the individual 100 hit a reference distance in a certain location, e.g., the home garage of the individual.

Figure 5:
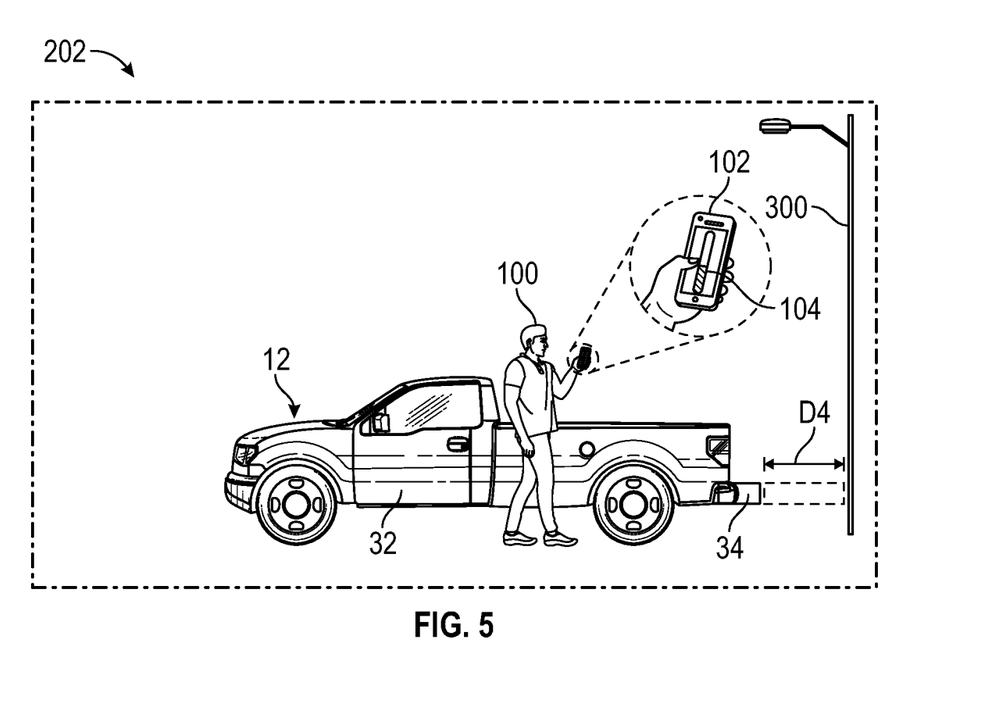
FIG. 5 is a front view of a person performing another remote maneuver of a vehicle, in accordance with another non-limiting embodiment of the disclosed concept.
Figure 6:
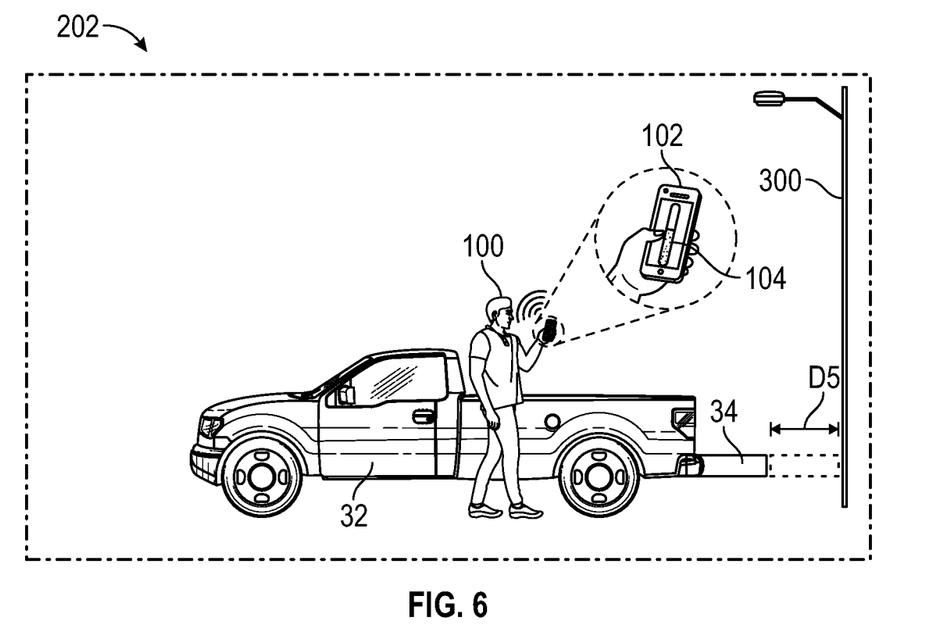
FIGS. 6 and 7 are other front views of the person performing the remote maneuver of the vehicle of FIG. 5 shown with portions of the vehicle in two different respective positions.
Figure 7:
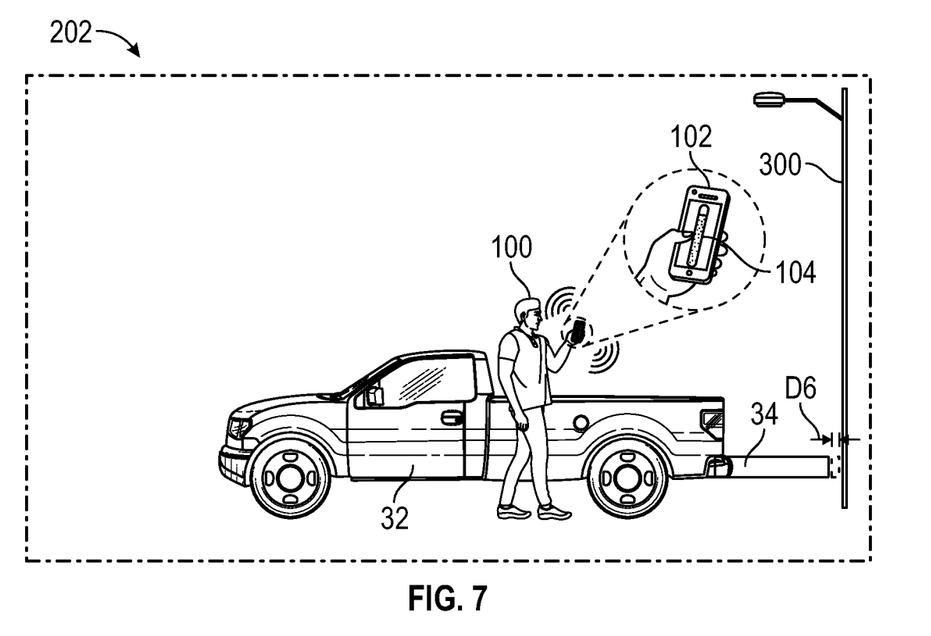

Additionally, other remote maneuvers are contemplated by the disclosed concept. For example and without limitation, as shown in FIGS. 5-7, the truck 12 is positioned proximate another object (e.g., a streetlight 300). In one example, the truck 12 includes a truck body 32 and an extendable truck bed 34 movably coupled to the truck body 32. In the example of FIGS. 5-7, the remote maneuver is a movement of the extendable truck bed 34 with respect to the truck body 32. As shown in FIGS. 5-7, the extendable truck bed 34 is spaced a first distance D4 from the streetlight 300 in FIG. 5, a second distance D5 from the streetlight 300 in FIG. 6, and a third distance D6 from the streetlight 300 in FIG. 7. The first distance D4 is greater than the second distance D5, which in turn is greater than the third distance D6. This corresponds to the extendable truck bed 34 being extended remotely (positioned outside of the truck 12) by the individual 100.

It will be appreciated that a remote maneuvering system 202 (FIGS. 5-7) may substantially be the same as the system 2, discussed above, except that the remote maneuver corresponds to the truck bed 34 being extended remotely with respect to the truck body 32. Accordingly, as shown, the haptic (e.g., vibration which is relatively silent) feedback provided to the mobile phone 102 of the individual 100 gets progressively more intense. Notice, for example, the absence of intensity symbols proximate the mobile phone 102 in FIG. 5, the single direction intensity symbols in FIG. 6, and the dual intensity symbols in FIG. 7, indicating the truck bed 34 is very close to the streetlight 300. Stated differently, the haptic feedback has a controllable parameter that is dependent on the distances D4-D6, and the controllable parameter may be controlled in the system 202 in the same manner as the system 2.

For example, as shown in FIGS. 5-7, the mobile phone 102 may have the distance control mechanism 104 that allows the individual 100 to remotely position the extendable truck bed 34 with respect to the streetlight 300. The mechanism 104 may be part of an APP on the mobile phone 102 and may also function to remotely move the truck 12 with respect to the other vehicle 92 in the example of FIGS. 1A, 1B, 3, and 4. In the example of FIG. 5, the distance control mechanism 104 is half-way activated. This corresponds to the distance D4 between the extendable truck bed 34 and the streetlight 300. In the example of FIG. 6, the distance control mechanism 104 is slightly more activated than in FIG. 5, which corresponds to the distance D5. Similarly, in the example of FIG. 7, the distance control mechanism 104 is even more activated than in FIG. 5, which corresponds to the distance D6. The individual 100 may thus remotely maneuver the truck 12, either into the empty space 60 or via the extendable truck bed 34, with the distance control mechanism 104 on the mobile phone 102. In turn, haptic feedback having a controllable parameter (e.g., mechanical vibration intensity, surface friction intensity, time duration, and/or frequency of vibration) can correspondingly be provided to the individual.

Additionally, in another example embodiment, when the processor 14 instructs the mobile phone 102 to provide the feedback to the individual 100, the feedback may be an audio feedback. As stated above, typical remote maneuvering of vehicles generally only provides audio feedback emanating relatively loudly from the vehicles themselves. In accordance with the disclosed concept, the processor 14 is configured to cause the mobile phone 102 to provide an audio feedback. However, since the audio feedback is emanating from the mobile phone 102, individuals other than the individual 100 will not be overly disturbed by the sounds from the mobile phone 102.

Figure 8:
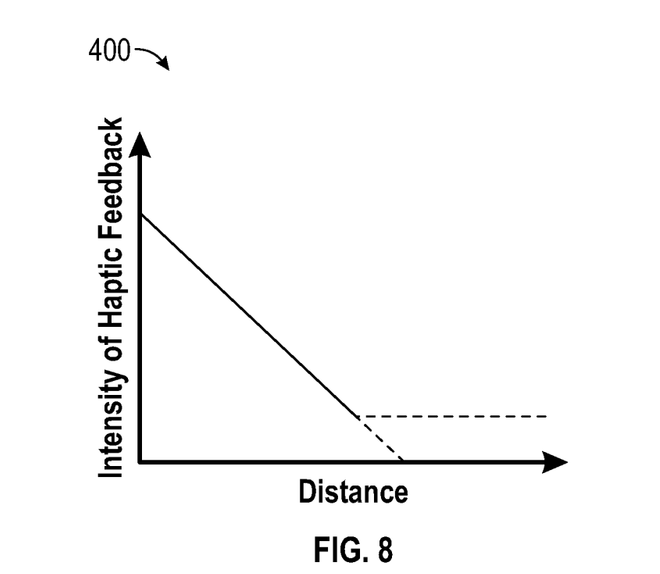
FIGS. 8 and 9 are different graphs corresponding to linear and non-linear intensity of a haptic feedback of a mobile device versus distance, respectively.
Figure 9:
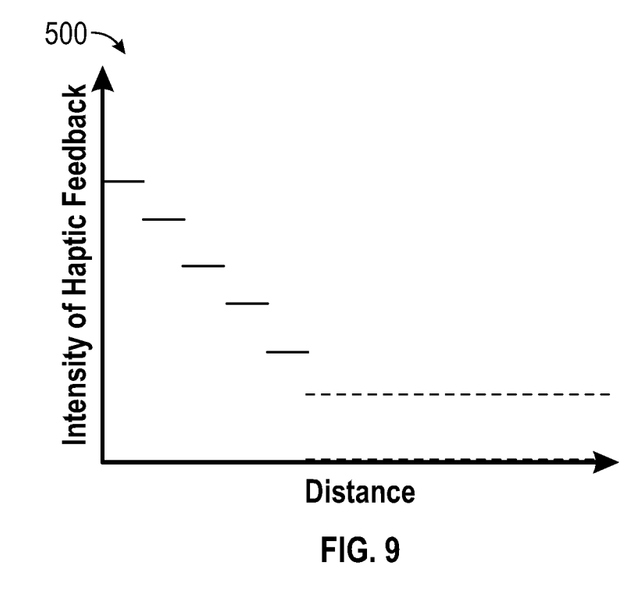

As stated above, the processor 14 of the truck 12 is configured to instruct the mobile phone 102 to provide feedback to the individual 100. The feedback, which may be haptic feedback, may be controlled in a number of different manners. For example, FIGS. 8 and 9 are different graphs 400,500 corresponding to linear (FIG. 8) and non-linear (FIG. 9) intensity of a haptic feedback of the mobile phone 102 versus distance, respectively. Accordingly, the haptic feedback may increase in a linear manner (FIG. 8) as the distance decreases (e.g., D1 to D3, and D4 to D6), or the haptic feedback may be in a non-linear manner (FIG. 9), e.g., wherein different intensity levels may occur over a range of distances, before which time the intensity changes to an even greater intensity. Furthermore, the intensity of the haptic feedback can be designed to stay in a constant level or drop to zero when the distance gets to a threshold value.

Figure 10:
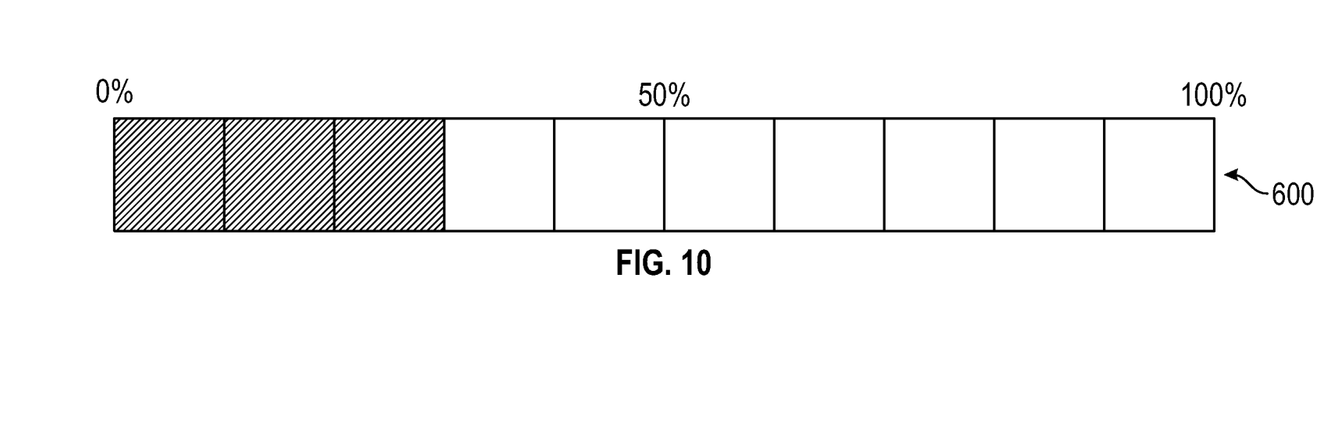
FIG. 10 shows an example detent design, in accordance with embodiments of the disclosed concept.

Additionally, FIG. 10 shows an example detent design 600, in accordance with embodiments of the disclosed concept. Different haptic feelings can be generated to the surface of the mobile phone 102 when the individual slides his/her finger to hit a detent. The haptic feeling can be the same or different for each detent. Detents are set based on the distances D1-D6. One example of the detent design is that detents can be designed to be like a volume control bar according to different distances (e.g., the distances D1-D6). Detents can be set at 10%, 20%, and so on of the maximum length of the volume bar. In the example of FIG. 10, the detent bar starts to appear in an APP on the mobile phone 102 when the distance between the truck 12 and an object (e.g., the other vehicle 92 and/or the streetlight 300) gets to a threshold value. As the individual 100 moves the truck 12 and/or extendable truck bed 34 closer to the obstacle, the mobile phone 102 gives different haptic feelings at each detent to remind the individual 100 of the distance.

Accordingly, the distance between the truck 12 and the obstacles is configured to change from a first distance D1,D4 to a second distance D3,D6, and the detent bar 600 may have a first detent, a second detent, and a plurality of detents between the first and second detents. The first and second detents may correspond to the first D1,D4 and second D3,D6 distances such that as the distance changes from the first distance D1,D4 to the second distance D3,D6, the feedback to the individual (e.g., to the mobile phone 102) at the first and second detents corresponds to the first D1,D4 and second D3,D6 distances.

It will also be appreciated that the system 2,202 may include the processor 14 and the memory 16, and a remote maneuvering method for the truck 12 may include performing a remote maneuver of the truck 12 and instructing the mobile phone 102 to provide a feedback to the individual 100.

Accordingly, the disclosed concept provides for a new system 2,202 and associated method in which relatively silent (e.g., without limitation haptic and/or audio provided at a mobile phone 102) feedback may be instructed to be provided to a mobile phone 102 from a processor 14 of a vehicle 12. By having feedback, and relatively silent feedback, an individual 100 may perform remote maneuvers, including remote park-assists and extending of an extendable truck bed 34 of the vehicle 12 in a more streamlined and efficient manner.

Although the vehicle 12 has been described as being a truck 12, it will be appreciated that the vehicle 12 may take the form of a passenger or commercial automobile such as, for example, a performance vehicle, a car, a crossover vehicle, a sport utility vehicle, a van, a minivan, a taxi, a bus, etc., and may be configured and/or programmed to include various types of automotive drive systems. Additionally, in one example embodiment, the vehicle 12 may be configured as an electric vehicle (EV). More particularly, the vehicle 12 may include a battery EV (BEV) drive system or be configured as a hybrid EV (HEV) having an independent onboard powerplant, a plug-in HEV (PHEV) that includes a HEV powertrain connectable to an external power source, and/or includes a parallel or series hybrid powertrain having a combustion engine powerplant and one or more EV drive systems. HEVs may further include battery and/or supercapacitor banks for power storage, flywheel power storage systems, or other power generation and storage infrastructure. The vehicle 12 may be further configured as a fuel cell vehicle (FCV) that converts liquid or solid fuel to usable power using a fuel cell, (e.g., a hydrogen fuel cell vehicle (HFCV) powertrain, etc.) and/or any combination of these drive systems and components.

Further, the vehicle 12 may have an autonomous driving system that is configured and/or programmed to operate in a fully autonomous (e.g., driverless) mode (e.g., Level-5 autonomy) or in one or more partial autonomy modes which may include driver assist technologies. Examples of partial autonomy (or driver assist) modes are widely understood in the art as autonomy Levels 1 through 4.

A vehicle having a Level-0 autonomous automation may not include autonomous driving features.

A vehicle having Level-1 autonomy may include a single automated driver assistance feature, such as steering or acceleration assistance. Adaptive cruise control is one such example of a Level-1 autonomous system that includes aspects of both acceleration and steering.

Level-2 autonomy in vehicles may provide driver assist technologies such as partial automation of steering and acceleration functionality, where the automated system(s) are supervised by a human driver that performs non-automated operations such as braking and other controls. In some aspects, with Level-2 autonomous features and greater, a primary user may control the vehicle while the user is inside of the vehicle or, in some example embodiments, from a location remote from the vehicle but within a control zone extending up to several meters from the vehicle while it is in remote operation.

Level-3 autonomy in a vehicle can provide conditional automation and control of driving features. For example, Level-3 vehicle autonomy may include "environmental detection" capabilities, where the autonomous vehicle (AV) can make informed decisions independently from a present driver, such as accelerating past a slow-moving vehicle, while the present driver remains ready to retake control of the vehicle if the system is unable to execute the task.

Level-4 AVs can operate independently from a human driver, but may still include human controls for override operation. Level-4 automation may also enable a self-driving mode to intervene responsive to a predefined conditional trigger, such as a road hazard or a system event.

Level-5 AVs may include fully autonomous vehicle systems that require no human input for operation, and may not include human operational driving controls.

The processor 14 of the vehicle 12 may be a commercially available general-purpose processor, such as a processor from the Intel® or ARM® architecture families. The memory 16 of the vehicle 12 may be a non-transitory computer-readable memory storing program code, and can include any one or a combination of volatile memory elements (e.g., dynamic random access memory (DRAM), synchronous dynamic random access memory (SDRAM), etc.) and can include any one or more nonvolatile memory elements (e.g., erasable programmable read-only memory (EPROM), flash memory, electronically erasable programmable read-only memory (EEPROM), programmable read-only memory (PROM), etc.

In the above disclosure, reference has been made to the accompanying drawings, which form a part hereof, which illustrate specific implementations in which the present disclosure may be practiced. It is understood that other implementations may be utilized, and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a feature, structure, or characteristic is described in connection with an embodiment, one skilled in the art will recognize such feature, structure, or characteristic in connection with other embodiments whether or not explicitly described.

Further, where appropriate, the functions described herein can be performed in one or more of hardware, software, firmware, digital components, or analog components. Certain terms are used throughout the description and claims refer to particular system components. As one skilled in the art will appreciate, components may be referred to by different names. This document does not intend to distinguish between components that differ in name, but not function.

It should also be understood that the word "example" as used herein is intended to be non-exclusionary and non-limiting in nature. More particularly, the word "example" as used herein indicates one among several examples, and it should be understood that no undue emphasis or preference is being directed to the particular example being described.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating various embodiments and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their ordinary meanings as understood by those knowledgeable in the technologies described herein unless an explicit indication to the contrary is made herein. In particular, use of the singular articles such as "a," "the," "said," etc. should be read to recite one or more of the indicated elements unless a claim recites an explicit limitation to the contrary. Conditional language, such as, among others, "can," "could," "might," or "may," unless specifically stated otherwise, or otherwise understood within the context as used, is generally intended to convey that certain embodiments could include, while other embodiments may not include, certain features, elements, and/or steps. Thus, such conditional language is not generally intended to imply that features, elements, and/or steps are in any way required for one or more embodiments.

That which is claimed is:

1. A system, comprising:
    a mobile device; and
    a vehicle comprising:
        a processor;
        a distance sensor electrically connected to the processor, the distance sensor configured to measure a distance between the vehicle and an object; and
        a memory comprising instructions that, when executed by the processor, cause the processor to perform operations comprising:
            receive instructions from the mobile device to perform a remote maneuver of the vehicle, the remote maneuver including moving the vehicle towards the object;
            perform the remote maneuver;
            cause the mobile device to provide haptic feedback associated with the remote maneuver,
        wherein the mobile device is configured to display a detent bar associated with the remote maneuver; wherein (i) the detent bar includes a plurality of detents and each of the plurality of detents is associated with a distance between the vehicle and the object and (ii) each detent of the plurality of the detents is associated with a different level of haptic feedback such that as the distance between the vehicle and the object decreases, the level of haptic feedback increases.

2. The system according to claim 1, wherein the remote maneuver is a remote park-assist.

3. The system according to claim 1, wherein the vehicle is a truck, wherein the truck comprises a truck body and an extendable truck bed movably coupled to the truck body, and wherein the remote maneuver is a movement of the extendable truck bed with respect to the truck body.

4. The system of claim 1, wherein the plurality of detents include:
    a first detent associated with a first distance between the vehicle and the object;
    a second detent associated with a second distance between the vehicle and the object, wherein the second distance is less than the first distance; and
    wherein the first detent is associated with a first intensity of the haptic feedback and the second detent is associated with a second intensity of the haptic feedback that is higher than the first intensity.

5. The system of claim 1, wherein the haptic feedback is non-linear such that a first intensity level of the haptic feedback occurs over a first range of the distance between the vehicle and the object.

6. A remote maneuvering method for a vehicle comprising the steps of:
    receiving, by the vehicle, instructions from a mobile device to perform a remote maneuver of the vehicle, the remote maneuver including moving the vehicle towards an object;
    performing, by the vehicle, the remote maneuver; and
    instructing a mobile device to provide haptic feedback associated with the remote maneuver, wherein the haptic feedback includes displaying a detent bar on the mobile device, wherein the detent bar includes a plurality of detents and each of the plurality of detents is associated with a distance between the vehicle and the object, and wherein each detent of the plurality of the detents is associated with a different level of haptic feedback such that as the distance between the vehicle and the object decreases, the level of the haptic feedback increases.

7. The method according to claim 6, wherein the remote maneuver is a remote park-assist.

8. The method according to claim 6, wherein the vehicle is a truck, wherein the truck comprises a truck body and an extendable truck bed movably coupled to the truck body, and wherein the remote maneuver is a movement of the extendable truck bed with respect to the truck body.

9. A remote maneuvering system, comprising;
    a mobile device; and
    a vehicle comprising:
        a processor,
        a distance sensor that measures a distance between the vehicle and an object; and
        a memory comprising instructions that, when executed by the processor, cause the processor to perform operations comprising:
            perform a remote maneuver of the vehicle, the remote maneuver including moving the vehicle towards the object; and
            instruct the mobile device to provide haptic feedback to an individual, the haptic feedback being associated with the remote maneuver and including a detent bar, the detent bar including a plurality of detents and each of the plurality of detents being associated with a distance between the vehicle and the object and each detent of the plurality of the detents being associated with a controllable parameter of the haptic feedback.

10. The remote maneuvering system according to claim 9, wherein the remote maneuver is a remote park-assist.

11. The remote maneuvering system according to claim 9, wherein wherein the controllable parameter is dependent on the distance of the vehicle with respect to the object.

12. The remote maneuvering system according to claim 11, wherein the controllable parameter is either an intensity of mechanical vibration, an intensity of surface friction, a time duration, and/or a frequency of vibration, and wherein as the distance of the vehicle with respect to the object decreases, either the intensity of mechanical vibration increases, the intensity of surface friction increases, the time duration decreases, and/or the frequency of vibration increases.

13. The remote maneuvering system according to claim 11, wherein the processor is configured to perform the remote maneuver of the vehicle only when the mobile device is within a predetermined distance of the vehicle.

14. The remote maneuvering system according to claim 11, wherein the distance between the vehicle and the object is configured to change from a first distance to a second distance, wherein the detent bar has a first detent, a second detent, and a plurality of detents between the first and second detents, wherein the first and second detents correspond to the first and second distances, and wherein, as the distance changes from the first distance to the second distance, the feedback to the individual at the first and second detents corresponds to the first and second distances.

15. The remote maneuvering system according to claim 9, wherein the vehicle further comprises a GPS system and a camera each electrically connected to the processor, wherein the mobile device has predetermined settings corresponding to a reference distance of the vehicle with respect to a predetermined location, and wherein the memory further comprises instructions that, when executed by the processor, cause the processor to employ the GPS system and the camera to determine whether the vehicle is within the reference distance, and thereby cause the mobile device to provide the haptic feedback.

16. The remote maneuvering system according to claim 9, wherein the memory further comprises instructions that, when executed by the processor, cause the processor to receive data from a weight sensor, a transmitter, and a receiver corresponding to a position of the vehicle with respect to the object, and send the data to the mobile device so that the mobile device can provide the haptic feedback.

17. The remote maneuvering system according to claim 9, wherein the vehicle is a truck, wherein the truck comprises a truck body and an extendable truck bed movably coupled to the truck body, and wherein the remote maneuver is a movement of the extendable truck bed with respect to the truck body.

18. The remote maneuvering system according to claim 9, wherein the haptic feedback is such that, an intensity of the haptic feedback is inversely proportional to the distance between the vehicle and the object.

19. The remote maneuvering system according to claim 9, wherein the haptic feedback is non-linear such that a first intensity level of the haptic feedback occurs over a first range of the distance between the vehicle and the object.

* * * * *